US005903753A

United States Patent [19]
Bramnick et al.

[11] Patent Number: 5,903,753
[45] Date of Patent: May 11, 1999

[54] NAME SPACE REGISTRY WITH BACKWARD COMPATIBILITY FOR OLDER APPLICATIONS

[75] Inventors: Arnold H. Bramnick, Boca Raton, Fla.; Douglas G. Elkins, Lawrenceville, Ga.

[73] Assignee: International Business Machines Corporation, Armonk, N.Y.

[21] Appl. No.: 08/516,544

[22] Filed: Aug. 18, 1995

[51] Int. Cl.⁶ .............................. G06F 15/163; G06F 9/00; G06F 9/46
[52] U.S. Cl. ................................... 395/680; 395/712
[58] Field of Search .................... 395/680, 681, 395/683, 712

[56] References Cited

U.S. PATENT DOCUMENTS

| | | |
|---|---|---|
| 5,083,262 | 1/1992 | Haff, Jr. . |
| 5,097,533 | 3/1992 | Burger et al. . |
| 5,249,300 | 9/1993 | Bachman et al. . |
| 5,257,369 | 10/1993 | Skeen et al. . |
| 5,261,080 | 11/1993 | Khoyi et al. . |
| 5,291,585 | 3/1994 | Sato et al. . |
| 5,297,279 | 3/1994 | Bannon et al. . |
| 5,317,722 | 5/1994 | Evans . |
| 5,333,298 | 7/1994 | Bland et al. . |

OTHER PUBLICATIONS

Configuration Manage and Registry, Kyle Marsh, MicroSoft Developer Network Technology Group Jan. 3, 1994.
Test Drive Win32 from 16-bit Code Using Window NT, James Finnegan, MicroSoft Journal Jun. 6, 1994.
Load Your 32-bit DII into Another Process's Address Space Using INJIB, Jeffrey Richter, MicroSoft Journal May 5, 1994.

Primary Examiner—Alvin E. Oberley
Assistant Examiner—Peter Stecher
Attorney, Agent, or Firm—Mark S. Walker; Jack V. Musgrove; Andrew J. Dillon

[57] ABSTRACT

A name space registry manages name space data within a computer operating system including configuration and initialization data. The registry provides access to the configuration information by means of an application program interface (API) for programs which can operate with the name space registry. Backward source-code compatibility is provided for older applications by maintaining configuration and initialization files that the older applications use to store configuration and initialization data under their traditional file names and with the traditional contents. Thus the older applications can directly access these files. The registry provides newer programs access to these configuration and initialization files through API program calls.

17 Claims, 3 Drawing Sheets

NAME SPACE REGISTRY WITH BACKWARD COMPATIBILITY FOR OLDER APPLICATIONS

FIELD OF THE INVENTION

The present invention relates to computer operating systems and more particularly to mechanisms for maintaining system configuration data for configuring operating systems.

BACKGROUND OF THE INVENTION

A conventional personal computer comprises a processor whose actions are controlled and coordinated by means of programs stored in main memory. For example, such programs may consist of operating system programs and application programs. The main memory is typically "volatile" and requires external electrical power to maintain its storage capability so that the programs in the main memory are erased whenever the electrical power is turned off or the computer is "powered down".

The computer is generally provided with additional non-volatile mass storage, typically in the form of magnetic media such as a "hard" or "floppy" disks on which relatively permanent copies of the programs can be stored. When the computer is initially turned-on or "powered up", or when an application program is loaded, some process or method must be used to both load the programs from the non-volatile mass storage into the volatile main memory and configure the programs to work with the hardware which comprises the computer.

The phrase commonly used to denote the process of loading and initializing both the operating system and the application programs is "bootstrapping" the computer or simply "booting" the computer or the application program. A boot process is a sequence of steps which are performed during the booting procedure. During the boot process, various set up parameters are usually determined by reading the contents of one or more "configuration" or "initialization" files containing a list of selected programs, definitions and parameters which are used to initialize the operating system or application program.

On earlier versions of operating systems, the configuration files were given specific, predefined names and the programs searched for these names when booted. For example, on personal computers that use the MS-DOS® operating system developed and sold by Microsoft Corporation, Redmond, Washington, the operating system definitions and the system commands are kept in two login files that work in tandem. System definitions are normally placed in a disk file which is named CONFIG.SYS and system commands are placed in disk batch file named AUTOEXEC.BAT. During the booting process, the computer will first load the device drivers and the system definitions specified in the CONFIG.SYS file and run the programs in the AUTOEXEC.BAT file. Once execution of the system commands in the AUTOEXEC.BAT file have been completed the system is ready for operation.

Operating systems also store data in files and memory locations, which data is provided to other programs, such as application programs. In general, a location in operating system stores data, and from which it provides this data to application programs, device drivers, and other programs is called herein a "repository." Repositories can include disk files, such as the CONFIG.SYS file, and memory wherein data on a floating-point processor is stored.

Programs and operating systems use the data that is stored in the repositories. For example, The MS-DOS operating system also stores, in memory, environment variables that it finds in the AUTOEXEC.BAT file. Application programs can then retrieve the contents of the environment variables and alter their own behavior based on these contents. For example, a word processing program can use the contents of the TEMP variable to locate scratchpad space on disk for temporary files.

Various application programs and system components can also read their own configuration and initialization files when they start up. For example, the WINDOWS™ program developed and sold by the Microsoft Corporation, Redmond, Washington is a well-known graphic interface program which has its own initialization files. When this program starts, it reads five initialization files, some of which contain parameters that specify the appearance of a user interface, a list of application programs to start automatically, and the size and location of a swap file.

Configuration and initialization files pose problems because they are difficult to maintain. For example, some operating systems such as the MS-DOS operating system referred to above use user-defined configuration files in that changes to the file are generally made by the user directly on the file in order to change the basic system configuration. User-defined configuration files require that the user know what hardware is resident on the system and also know how to edit the login files in order to properly inform the system of the presence of the hardware.

Developers of prior art installation and configuration procedures have attempted to overcome these problems by providing automatic procedures that updated the configuration and initialization files. These procedures reduced the risk of introducing errors because no human interactions were involved. For example, some operating systems automatically detect, and store data about, the presence and amount of various hardware resources, such as memory, disks, and floating-point processors, that are available on a computer. These latter operating systems relieve the user of the responsibility of actually manually editing the configuration file. Many other automatic application installation procedures also create application-specific initialization and configuration files.

However, there are still other problems. Some of these latter prior art systems, such as the OS/2® operating system developed and sold by the International business Machines Corporation, Boca Raton, Fla., use configuration and initialization files, e.g. OS2.INI, which contain binary data and cannot be updated with a traditional text editor.

Even ASCII text configuration and initialization files are difficult to maintain with a traditional text editor because text editors do not check syntax. A user or system administrator can thus introduce syntax errors or "pathological" interactions amongst entries in these files. Further, text editors do not check for missing critical sections. Hence, it is possible for a user or system administrator to create a configuration or initialization file from which the system or an application will not start.

These ad hoc solutions create other problems because of the wide variety of configuration and initialization files they create on many computers. Sometimes related data is stored in two or more files and in several directories. For example, the MS-DOS operating system typically requires entries in both CONFIG.SYS file and in AUTOEXEC.BAT file in order to use CD-ROM hardware devices.

In addition, many of the configuration and initialization files, particularly those that relate to applications programs, are poorly documented. This poses problems for operating system and application developers. They must learn the location, syntax and semantics of each of these files because no common format exists for these files.

Developers of some prior art operating system software, such as WINDOWS NT®, have attempted to impose a uniform structure on the data stored in the various repositories by providing "name space" services. A name space is a collection of all the data that an operating system manages. A name space service, or "registry," stores and organizes the data into a hierarchy, much like the objects in an object oriented programming system. Each piece of data has a name and a class and can optionally have one or more values associated with it. A registry is generally accessed by a predefined set of functions or function calls called an application program interface (API) and stores all the data formerly stored in the various repositories, e.g. memory locations and files, such as CONFIG.SYS. Programs, via calls to a registry API, can request, add, modify and delete data in a name space. With a single name space service API, one documentation standard can be used by both users and application programmers.

Automatic application installation procedures call a name space service API to register the installation of application software, check for the existence of prerequisite hardware and/or software components, and, when appropriate, locate and remove superseded versions of an application.

However, the use of a single name space service poses problems for developers and users of "older" application programs and automatic installation procedures. "Older" applications and procedures are ones that assume the existence of, and directly access, configuration and initialization files with predefined names such as CONFIG.SYS. Since these names are generally coded into the program, these older application programs and procedures must be rewritten to make calls to a new API in order to run with prior art systems that provide a name space service. This problem is significant because many older applications exist and users and system administrators are reluctant to upgrade to operating systems that provide a single name space service if they cannot use their existing application programs. Forcing application developers to rewrite existing applications to use a name space server API and forcing users and system administrators to buy updated application programs is expensive, wasteful and impedes the movement to more modern and robust operating systems.

SUMMARY OF THE INVENTION

In accordance with the invention, a name space registry provides both an application program interface (API) for "newer" applications while maintaining the configuration files under their predefined names so that older applications can still directly access and use the files. In accordance with one illustrative embodiment, the inventive registry is part of an operating system.

The name space data that the inventive registry manages is distributed among several repositories. These repositories include disk files and memory and these files include the "traditional" repository files such as CONFIG.SYS and OS2.INI which store selected name space data. Application programs that are written to run under older operating systems directly access the traditional repository files. "Newer" application programs that are written to use the name space registry access name space data exclusively through the name space registry API, regardless of which repository contains the data (even if the data is in the traditional repository files such as the CONFIG.SYS file.)

Older application programs do not reference name space data beyond that which is stored in the traditional repositories, so older applications need not, and do not, make API calls to the registry.

The inventive registry provides backward compatibility for older programs by preserving the traditional repositories and allowing older applications to read from and write to the traditional repositories as they did under prior art operating systems. At the same time, the registry allows new applications access, via API calls, to the data stored in the traditional repositories, as described above and to additional repositories which are not used by the older applications.

BRIEF DESCRIPTION OF THE INVENTION

The above and further advantages of the invention may be better understood by referring to the following led description, in conjunction with the accompanying drawings, in which.

DETAILED DESCRIPTION OF AN ILLUSTRATIVE EMBODIMENT

Figure 1:
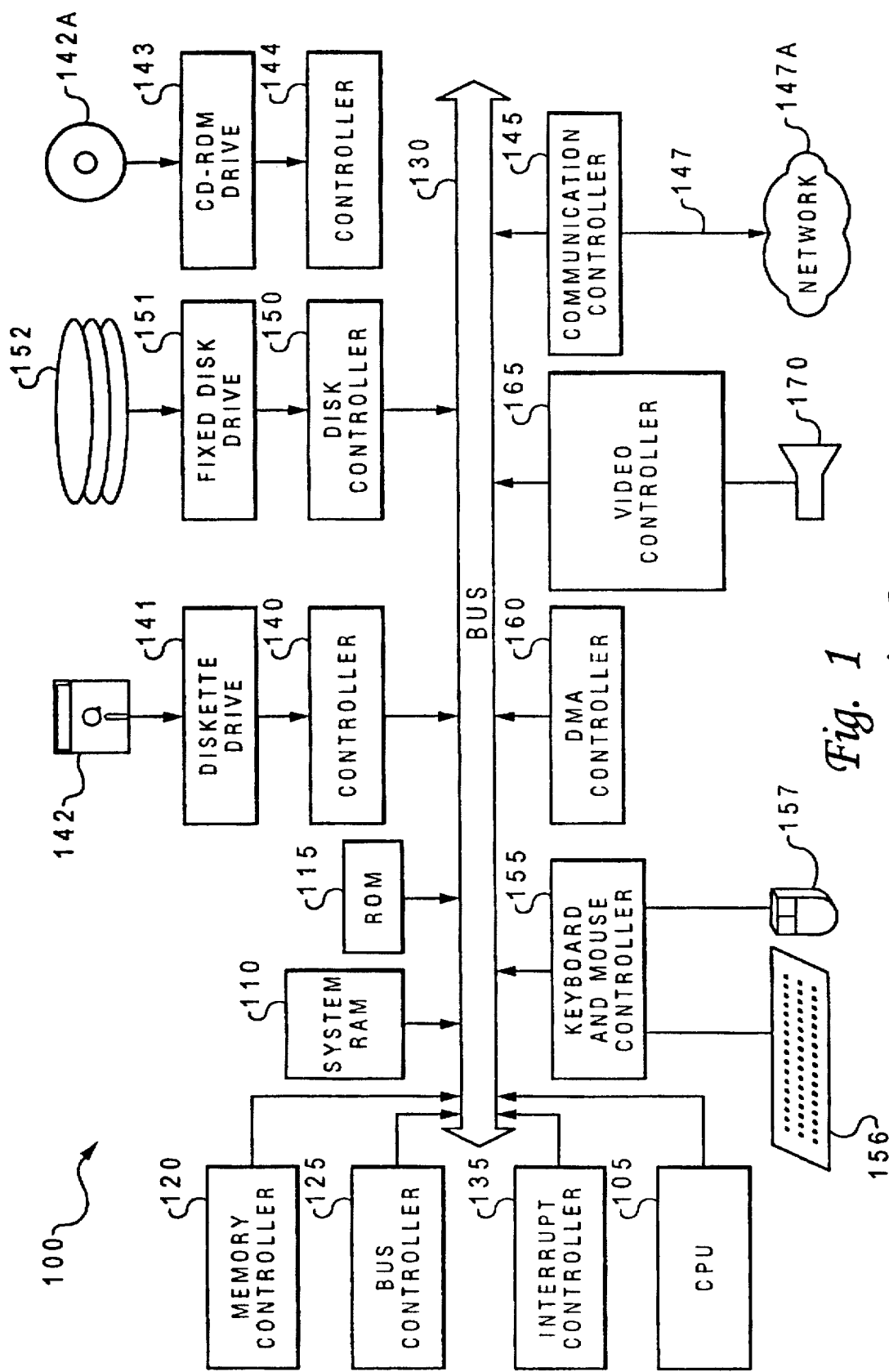
FIG. 1 is a block diagram of a computer system, for example a personal computer system, on which the invention may be practiced.

FIG. 1 illustrates the system architecture for a conventional computer system, such as an IBM PS/2® personal computer ("PC") on which the present invention can operate. The exemplary computer system of FIG. 1 is for descriptive purposes only. Though the description below may refer to terms commonly used in describing particular computer systems, such as an IBM PS/2® PC, the concepts equally apply to other systems, including those having dissimilar architectures.

The exemplary computer 100 includes a central processing unit ("CPU") 105, which may include a conventional microprocessor; a random access memory ("RAM") 110 for temporary storage of information; a read only memory ("ROM") 115 for permanent storage of information; a diskette controller 140 for controlling a diskette 142 that may be inserted into computer 100; a disk controller 150 for controlling a hard disk 152 that is local to the computer 100; a keyboard and mouse controller 155 for controlling a keyboard input device 156 and a mouse input device 157; a DMA controller 160 for performing direct memory access to RAM 110; a video controller 165 for controlling a video output display 170; a memory controller 120 for controlling RAM 110; a bus controller 125 for controlling bus 130; and an interrupt controller 135 for receiving and processing various interrupt signals. Communication controller 145 communicates via medium 147 to a network. Controller 145 may correspond to a local area network communication controller, for example, or a modem controller. Similarly, medium 147 may correspond to a tangible medium, such as local area network cable or a telephone link. Or, medium 147 may use wireless techniques, such as microwave or infrared transmission techniques.

The computer 100 is generally controlled and coordinated by operating system software, which has a name space registry. An example of such an operating system is WARPOS/2®, developed and sold by the International Business Machines Corporation ("IBM"), Boca Raton, Fla. Such an operating system performs memory management, provide file system services, provide networking and I/O services, provide a user interface, such as a graphical user interface ("GUI"), and the like. User applications, such as editors and spread sheets, directly or indirectly, rely on these and other capabilities.

As is known in the art, operating systems often include most, if not all, of the above functionality; some provide more; some provide less. To better understand the system structure of two conventional operating systems, the following sections are provided.

Figure 2:
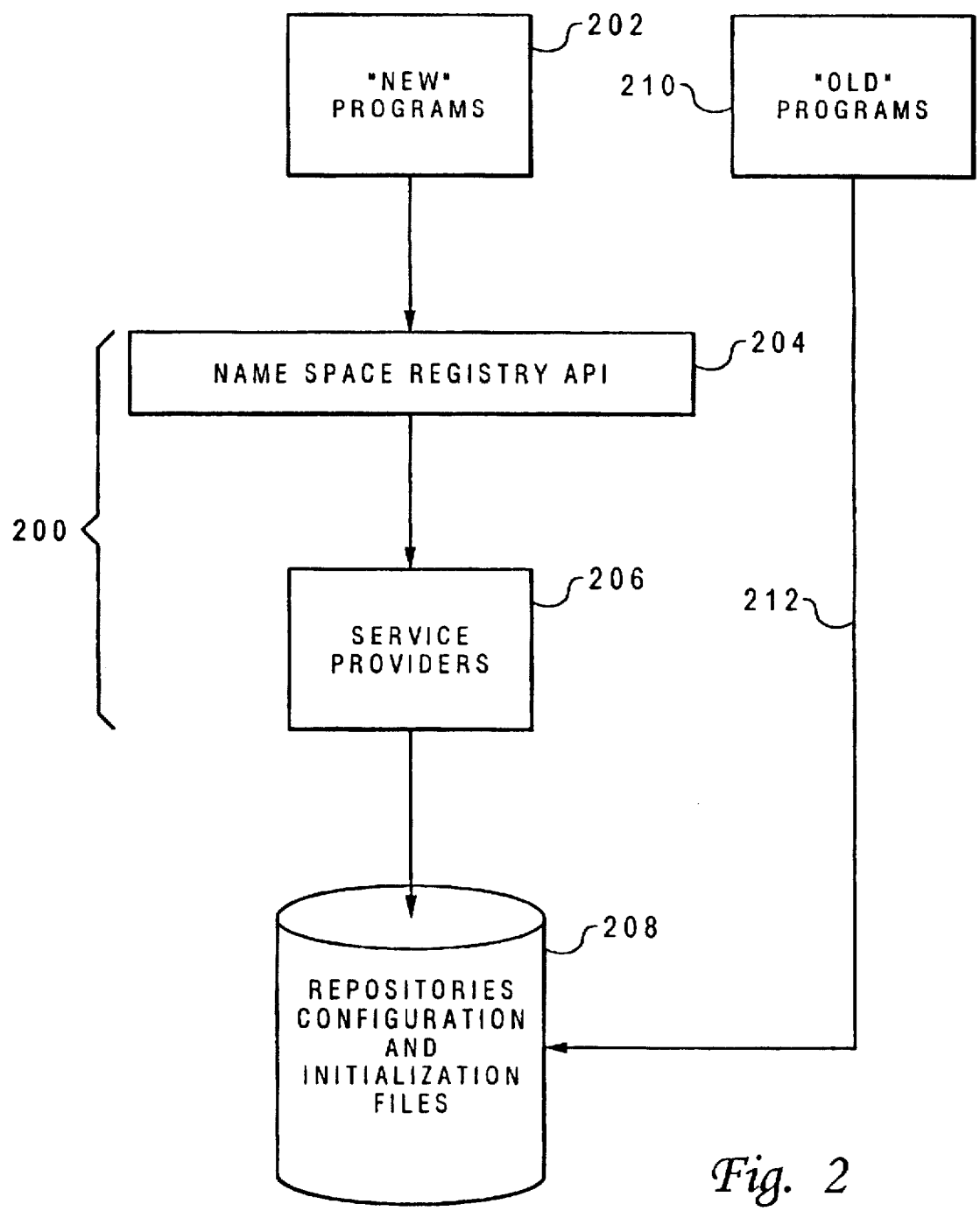
FIG. 2 is a block diagram of the name space registry.

Each program that is run on the computer 100 requires a path that will give it access to various configuration and initialization data subsets (hereinafter "repositories") that are existent in some data storage device within computer 100. FIG. 2 shows a block diagram of a preferred embodiment of a name space registry 200 (hereinafter "registry") that enables both "new" programs schematically represented by box 202 and "old" programs schematically represented by box 210 to access and manipulate the various repositories 208. Generally speaking, the registry 200 provides a uniform interface represented as box 204 between the repositories 208 and any "new" program 202 that requires access to them. Accordingly, the term "new" program refers to those programs 202 that access the repositories 208 through this uniform interface 204. The term "old" program therefore refers to programs 210 that do not access the repositories 208 with the uniform interface 204, but rather access certain repository files directly.

As shown in FIG. 2, new programs 202 request access to the repositories 208 through interaction with name space registry application program interface 204 ("API"). API 204 accordingly employs a number of service providers 206 that store and retrieve data in the repositories 208. Although a service provider 206 can manage more than one repository 208, it is preferred that each repository 208 have one associated service provider 206 that acts between API 204 and each respective repository 208.

Before the API 204 system was implemented in many computer systems, old programs designed for use with those systems were programed to access the data subsets stored within the repository 208 by directly calling them by their predefined system names. For example, an old program 210 used with an MS-DOS® operating system loads device drivers by directly accessing the contents of CONFIG.SYS file which is part of repositories 208 as indicated schematically by arrow 212. Many current computer systems, however, do not have a specific configuration file named CONFIG.SYS, thus rendering the old programs 210 unusable on such systems.

Registry 200 overcomes this problem by maintaining selected configuration files using the predefined system names that will be expected by the older programs and maintaining in these files the information required by the older programs. Registry 200 also provides a path 212 directly to selected files in repository 208 for old programs 210. Accordingly, both old and new programs can effectively utilize newer computer systems.

Some computer systems use sets or portions of other data files, generally referred to as "portions", in accessing configuration data. A newer system, for example, might access a portion of CONFIG.SYS and a portion of a more recent configuration file.

Figure 3:
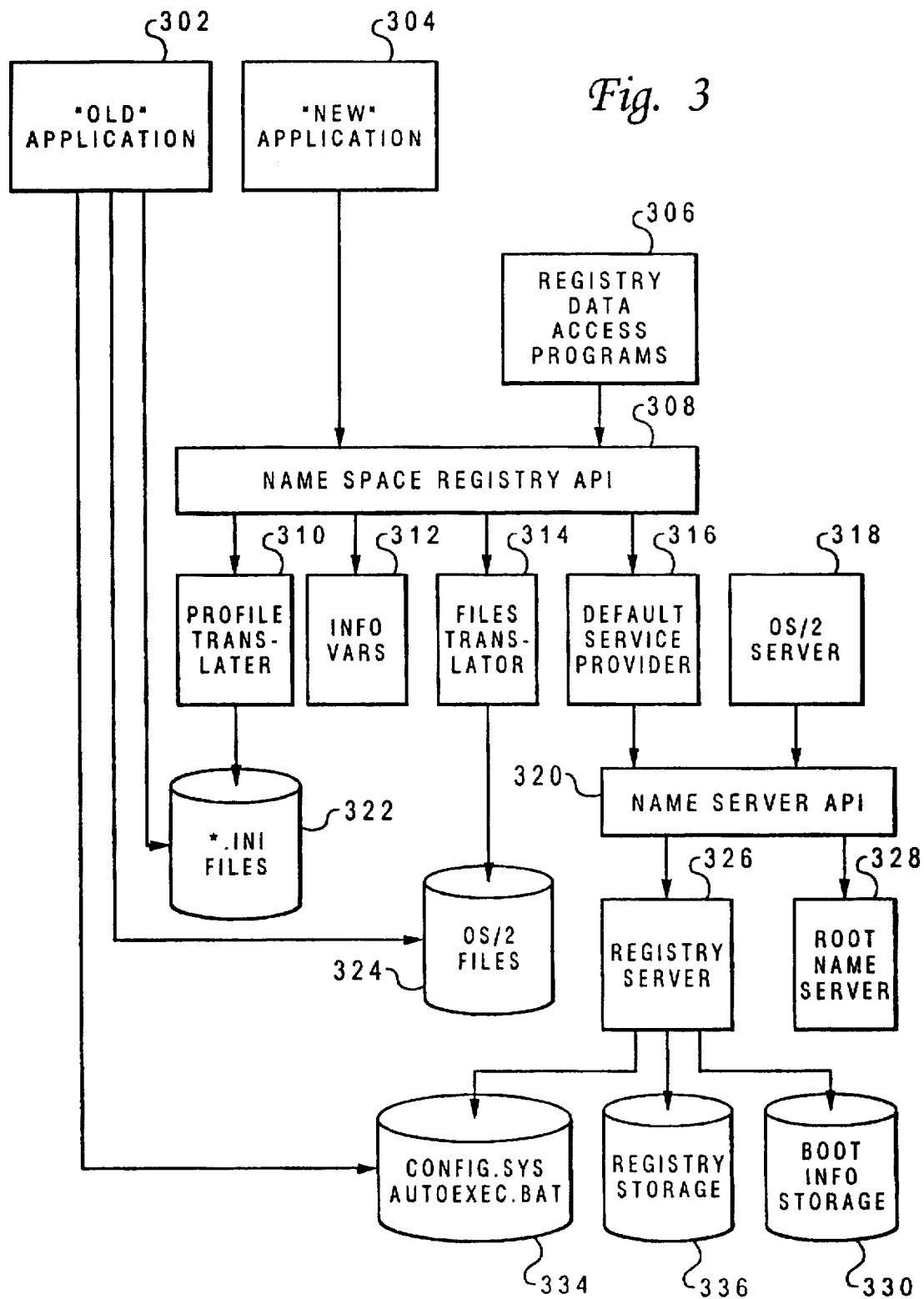
FIG. 3 is a block diagram of the name space registry having more detail than FIG. 2.

FIG. 3 shows more detail of various elements within an operating system employing the inventive registry constructed in accordance with the principles of the present invention. In particular, an illustrative operating system which is suitable for use with the present invention is the OS/2 WARP CONNECT (Power PC edition) operating system mentioned above, although other operating system could also be used. Such operating system includes a name space registry which comprises a plurality of databases which are controlled by a plurality of service providers 310–318 which are, in turn, accessed via a name space registry API 308. The API 308, which is represented by a box actually consists of a number of standard functions which can be called by an application program to request information from the database via the service providers and the mechanism to handle calls to the functions and route the calls to the proper "service provider" to obtain the requested information.

Information in the name space registry database can be entered, changed and deleted by means of access programs 306. These can include a graphical user interface which provides a user with a view of the database information in a windowing environment and various utility programs. These programs operate in a well-known fashion and will not be discussed further herein. The name space registry information can also be accessed via the API 308 by "new" applications 304 which have been written to interact with the API calls.

Calls to the API functions are actually serviced by a number of service providers 310–318 which can each request, add, modify, and/or delete data in a specific repository 322, 324, 330, 334 and 336. In a illustrative embodiment, each repository has one associated service provider, although a single service provider can manage more than one repository. In response to an API call from a new application program 304 to retrieve data, the registry API 308 forwards the program call to a service provider (one of providers 310–318) that is associated with the desired data. The service provider retrieves the requested data and returns it to the registry 308, which, in turn, returns it to the application program. Similarly, API calls from new application programs 304 to store, modify, or delete data are routed by the registry 308 to the associated service provider. The service provider then stores or modifies data in the associated repository. The registry typically performs all-or-nothing transactions when updating the repositories 322, 324, 330, 334 and 336 to insure data integrity.

The registry system uses several service providers to store and retrieve data in the traditional repositories in response to the name space registry API calls. For example, a profile translator service provider 310 gives a requesting program access to information in binary initialization files which are commonly used in some operating systems and application programs. For example, these files might include the OS2.INI, OS2SYS.INI, and other OS/2 binary initialization files (indicated collectively by *.ini) maintained in database 322. The server 310 translates the binary files in accordance with a predetermined profile to place the results in a standard format for return to the application program 304.

An information variables service provider 312 gives a program 304 access to environment variables and to system information normally provided queries generated through an API such as the DosQuerySysInfo API. This system information might include the amount of physical memory installed, the boot drive identification or address, OS major/minor/revision numbers and various other information typically needed by an install program or script.

A file translator service provider 314 gives a program 304 access to information which is typically used in, or to identify, files in other operating systems. This information could include volume information (i.e. "logical" drives used in some operating systems such as the OS/2 and MS-DOS operating systems), file names, data, attributes, and extended attributes. As with the other service providers this information may be translated into a standard form before being returned to the application program 304.

Finally, a default service provider 314 gives a program 304 access, through a name server API 320, to additional information including configuration information stored in databases 330, 334 and 336 which are generally "persistent" (information remains after the system is powered down.) Various data stored in the repositories 330, 334 and 336 might include initialization files such as the CONFIG.SYS file mentioned above stored in database 334, other files stored in database 336 and boot information files stored in database 330. The files in the latter three databases are accessed by "new" programs by means of registry server 326 via name space API 320. Additional booting information which is "transient" (not maintained after the system is powered down and recreated during the booting process) is available to the application program 304 from the root name server 328. This latter information is also available to an older operating system such as OS/2 by means of a special server 318. Server 318 allows the OS/2 operating system access to the boot system information.

As shown in FIG. 3, certain configuration fifes such as CONFIG.SYS, AUTOEXEC.BAT and the initialization files OS2.INI and OS2SYS.INI are maintained in the inventive registry under their original names. In addition, the information stored in these files remains the same as in the prior art systems. "New" programs can access this information via the registry system. In addition, "old" programs, such as old OS/2 applications 302, still have direct access to these configuration files by using their specific system names as generally coded into the old program code. In addition, the original file structure of the stored files (illustrated as OS/2 files 324) is maintained so that these older programs can still operate with the files. It should be noted, however, that old programs do not need to access many of the data subsets existent within the repositories 312, 330 and 336 that must be accessed by new programs. Accordingly, no path exists to reach these files except through the registry API 308.

Thus, unlike computer systems of the prior art, the inventive registry provides backward source-code compatibility for the older programs, such as 32-bit OS/2 2.x applications, by not requiring them to undergo a source code change when recompiled and executed on, for example, a computer system running the OS/2 WARP CONNECT (Power PC edition) operating system incorporating the inventive registry system. Such programs can directly read and write CONFIG.SYS and other applications within the repositories 322 and 334. Similarly, new programs written for the inventive registry system can uniformly and efficiently access the same information using the API 308.

The name space registry 320 is arranged in a conventional manner. More specifically, the registry treats the data stored in the name space as nodes in a tree structure. Each node has a type and zero or more attributes. Each link between a pair of adjacent nodes has an ID. The identity of a particular node is formed by concatenating all the link IDs, starting with the root of the tree and ending with the node itself. The registry performs all-or-nothing transactions when updating the name space to insure its integrity. In cases where a requested change to the name space involves changing more than one node, the registry insures that either all or none of the nodes is changed as a result of an API call to change the name space. The name space remains consistent and reflects either the state before any change was made, or the state after all the changes were made, but never an inconsistent state wherein only some of the nodes are changed.

The registry 320 also synchronizes access by old applications 302 and new applications 304 to the traditional repositories 322, 324 and 334 so that the data stored therein is always consistent. If a service provider such as profile translator 310, receives a request to access data that resides in a traditional repository file 322 and the file 322 is already open for write access, e.g., by an older application 302, the service provider 310 waits until the application 302 closes the file.

In response to a request to access data in the name space, the API 308 and the appropriate service providers 310, 314 and 326 can cooperate to open, for write access, all the necessary files before updating any of them. This ensures that no other program, e.g., an older application 302, can open one of the files and make changes therein after the registry 308 has made some, but not all, of the changes requested by the API call.

The registry storage server 326 consists of two sides: the client-side which interfaces with name server API 320 and the server side which accesses the databases 330, 334 and 336. There are many instances of the client-side but only one instance of the server-side. The client-side is typically implemented as a library executed in the client context by a process, task, or shared library subsystem. The server-side is preferably a "personality neutral" server implemented as kernel task. "Personality neutral" means that the server side task is not tailored for a particular operating system. Communications between client and the server sides are accomplished by allocating and constructing data structures on both the client and server side and then communicating between the structures via messages. When large amounts of information need to be shared between client and server in either direction, the information may be sent out-of-line in messages, or mapped directly into the receiver's address space in order to improve performance.

The primary memory stores for data structures are a workspace which consists of a memory heap on the client-side. The workspace is used to fabricate node and attribute structures that are returned to the client application for the aforementioned tree structure. It is also used to record a list of storage segments mapped into the client address space and to maintain a reference to the storage segments. A workspace is created by an API call such as "NS$_{13}$ CreateWorkspace". An application can optionally share its workspace with other applications.

Storage segments, in turn, are portions of the memory stores 330, 334 and 336 served up by the registry storage server 326. Storage segments may be sent out-of-line or mapped by clients. The primary difference between the information structures in the application and workspace memory and the same structures in memory segments is how the structures are linked together. In memory, pointers are used while in segments, segment index/offsets are used.

There are two ways an application can request information. One way is for the application to provide a result buffer. The requested information is copied from storage segments into the buffer. The other way is the application can ask for the registry to supply memory that contains the requested information. In this case, the application receives a pointer to a node or attribute structure created in a workspace, and the workspace contains pointers directly to any information strings in the storage segment as it was read into memory by the registry storage server 326.

In an alternate embodiment, the invention may be implemented as a computer program product for use with a computer system. Such implementation may comprise a series of computer instructions either fixed on a tangible medium, such as a computer readable media, e.g. diskette 142, CD-ROM 142A, ROM 115, fixed disk 152 (FIG. 1), or transmittable to a computer system, via a modem or other interface device, such as communication controller connected to the network 147A over a medium 147, which can be either a tangible medium, including but not limited to optical or analog communications lines, or use wireless techniques, including but not limited to microwave, infrared or other transmission techniques. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices, or transmitted using any communications technology, present or future, including but not limited to optical, infrared, microwave, or other transmission technologies. It is contemplated that such a computer program product may be distributed as a removable media with accompanying printed or electronic documentation, e.g., shrink wrapped software; preloaded with a computer system, e.g., on system ROM or fixed disk, or distributed from a server or electronic bulletin board over a network, e.g., the Internet or World Wide Web.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. Apparatus for allowing a first program to maintain configuration data by means of a first access protocol and a second program to maintain the configuration data by means of a second access protocol, the apparatus comprising:

a configuration file containing a portion of the configuration data in a first format compatible with the first access protocol;

a name registry containing the remainder of the configuration data in a second format compatible with the second access protocol;

first means controlled by the first program for storing and retrieving configuration data in the configuration file in the first format using the first access protocol;

second means controlled by the second program for storing and retrieving configuration data in the name registry in the second format using the second access protocol; and third means controlled by the second program and responsive to the second access protocol for storing and retrieving configuration data in the configuration file in the first format.

2. The apparatus defined in claim 1, wherein the configuration data is comprised of a plurality of distinct portions and wherein the first means, the second means and the third means each comprise apparatus for storing and retrieving one of the plurality of distinct portions.

3. The apparatus defined in claim 2, wherein the first means comprises means responsive to commands generated by the first program for retrieving all of the configuration data in the configuration file and means responsive to the retrieved configuration data for parsing at least part of the retrieved configuration data in order to separate a particular distinct portion.

4. The apparatus defined in claim 2 wherein the second means comprises means for storing each of the plurality of distinct portions in an accessible location in the name registry and means responsive to commands generated by the second program for locating a particular distinct portion.

5. The apparatus defined in claim 2 wherein the second means comprises means for storing each of the plurality of distinct portions in an accessible location in the name registry and means responsive to commands generated by the second program for directly retrieving only a particular distinct portion.

6. A registry for interfacing a first program to a data set, the data set containing data, the data having different first and second subsets, the first subset being stored in a registry repository, and the second subset being stored in a configuration file separate from the registry repository, the registry comprising:

a first service provider for storing the first subset of the data and, responsive to a program call, for retrieving data from the first subset in a first format and for providing the retrieved data;

a second service provider, responsive to a program call, for retrieving data from the configuration file in a second format and for providing the retrieved data; and an application program interface, interconnected with the first and second service providers, responsive to a program call from the first program requesting data in the data set by selecting the first service provider when said requested data is in the first subset and selecting the second service provider when said requested data is in the second subset, routing the program call to the selected service provider and returning to the first program the data provided by the selected service provider in response to the program call.

7. The registry defined in claim 6, further comprising:

a second program, the second program retrieving data from the first file without generating a program call to the application programming interface.

8. The registry defined in claim 7, wherein the data has a third subset, the third subset being different than the first and second subsets, and the third subset being stored in a second file, the registry further comprising:

a third service provider, responsive to a program call, for retrieving data from the second file and for providing the retrieved data; and an intermediate service provider interconnected between the application programming interface and the third service provider, responsive to a program call from the application programming interface to access data in the data set by routing the program call to the third service provider and providing to the application programming interface the data provided by the third service provider in response to the program call; and wherein the application programming interface selects the intermediate service provider when the requested data is in the third subset.

9. The registry defined in claim 8, wherein the intermediate service provider comprises:

a default service provider interconnected with the application programming; and a name server shared library, interconnected between the default service provider and the third service provider.

10. The registry defined in claim 9, wherein the first program comprises means responsive to a program call requesting storage of data in the data set for supplying data to the application programming interface and means in the application programming interface for routing the supplied data to the selected service provider; and wherein the intermediate service provider is responsive to its selection for routing the supplied data to the third service provider and wherein the first service provider is responsive to a program call for storing the supplied data in the first subset, the second service provider is responsive to a program call for storing the supplied data in the first file, and the third service provider is responsive to a program call for storing the supplied data in the second file.

11. A computer system allowing a first program to maintain configuration data by means of a first access protocol and a second program to maintain the configuration data by means of a second access protocol, the computer system comprising:

a central processing unit;

a bus connected to the central processing unit;

main memory means, connected to the bus, for storing at least part of the first and second programs;

mass storage means, connected to the bus, for storing at least part of the first and second programs and for providing at least portions of the programs to the main memory means;

a configuration file stored in the mass storage means, the configuration file containing a portion of the configuration data in a first format compatible with the first access protocol;

first means, controlled by the first program, for storing and retrieving configuration data in the configuration file in the first format using the first access protocol; and an operating system, at least part of which is stored in the main memory means, for controlling operation of the CPU and the mass storage means; the operating system comprising:

a name registry containing the remainder of the configuration data in a second format compatible with the second access protocol;

second means, controlled by the second program, for storing and retrieving configuration data in the name registry in the second format using the second access protocol; and third means, controlled by the second program and responsive the second access protocol, for storing and retrieving configuration data in the configuration file in the first format.

12. The computer system defined in claim 11, wherein the configuration data comprises a plurality of distinct portions and wherein the first, second, and third means for storing and retrieving configuration data each comprise apparatus for storing and retrieving one of the plurality of distinct portions.

13. The computer system defined in claim 12, wherein the first means for storing and retrieving configuration data comprises means, responsive to commands generated by the first program, for retrieving all of the configuration data in the configuration file and means, responsive to the retrieved configuration data, for parsing at least part of the retrieved configuration data in order to separate a particular distinct portion.

14. A computer system for interfacing a first program to a data set, the data set containing data, the data having different first and second subsets, the first subset being stored in a registry repository, and the second subset being stored in a configuration file separate from the registry repository, the computer system comprising:

a central processing unit;

a bus connected to the central processing unit;

main memory means, connected to the bus, for storing at least part of the first program;

mass storage means, connected to the bus, for storing at least part of the first program and for providing at least portions of the program to the main memory means; and an operating system, at least part of which is stored in the main memory means, for controlling operation of the CPU and the mass storage means, the operating system comprising:

a first service provider for storing the first subset of the data and, responsive to a program call, for retrieving data from the first subset in a first format and for providing the retrieved data;

a second service provider, responsive to a program call, for retrieving data from the configuration file in a second format and for providing the retrieved data; and an application program interface, connected with the first and second service providers, responsive to a program call from the first program requesting data in the data set by selecting the first service provider when said requested data is in the first subset and selecting the second service provider when said requested data is in the second subset, routing the program call to the selected service provider and returning to the first program the data provided by the selected service provider in response to the program call.

15. The computer system defined in claim 14, further comprising:

a second program, the second program retrieving data from the first disk file without generating a program call to the application programming interface.

16. The computer system defined in claim 15, wherein the data has a third subset, the third subset being different than the first and second subsets, and the third subset being stored in a second disk file, the operating system further comprising:

a third service provider, responsive to a program call, for retrieving data from the second disk file and providing the retrieved data; and an intermediate service provider interconnected between the application programming interface and the third service provider, responsive to a program call from the application programming interface to access data in the data set by routing the program call to the third service provider and providing to the application programming interface the data provided by the third service provider in response to the program call; and wherein the application programming interface selects the intermediate service provider when the requested data is in the third subset.

17. A computer program product comprising:

a computer usable medium having computer readable program code means embodied in said medium for allowing a first program to cause a computer to maintain configuration data that is accessible by means of a first access protocol, and for allowing a second program to cause the computer to maintain the configuration data that is accessible by means of a second access protocol, a portion of the configuration data being stored in a configuration file in a first format that is compatible with the first access protocol, the remainder of the configuration data being stored in a name space registry in a second format that is compatible with the second access protocol, the computer program comprising:

first means controlled by the first program for causing the computer to store and retrieve configuration data in the configuration file in the first format using the first access protocol;

second means controlled by the second program for causing the computer to store and retrieve configuration data in the name registry in the second format using the second access protocol; and third means controlled by the second program and responsive to the second access protocol for causing the computer to store and retrieve configuration data in the configuration file in the first format.

* * * * *